US012631910B2

(12) United States Patent
Kimura et al.

(10) Patent No.: US 12,631,910 B2
(45) Date of Patent: May 19, 2026

(54) OPTICAL SEMICONDUCTOR DEVICE, OPTICAL MODULATOR AND OPTICAL TRANSMISSION DEVICE

(71) Applicant: Mitsubishi Electric Corporation, Tokyo (JP)

(72) Inventors: Kosuke Kimura, Tokyo (JP); Takashi Nagira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 293 days.

(21) Appl. No.: 18/684,817

(22) PCT Filed: Dec. 7, 2021

(86) PCT No.: PCT/JP2021/044988
§ 371 (c)(1),
(2) Date: Feb. 19, 2024

(87) PCT Pub. No.: WO2023/105644

PCT Pub. Date: Jun. 15, 2023

(65) Prior Publication Data

US 2025/0123505 A1      Apr. 17, 2025

(51) Int. Cl.
*G02F 1/017* (2006.01)
*G02F 1/015* (2006.01)
*G02F 1/21* (2006.01)
(52) U.S. Cl.
CPC ........ *G02F 1/01716* (2013.01); *G02F 1/0157* (2021.01); *G02F 1/212* (2021.01)
(58) Field of Classification Search
CPC ..... G02F 1/01716; G02F 1/212; G02F 1/0157
(Continued)

(56) References Cited

U.S. PATENT DOCUMENTS

2009/0285519 A1    11/2009   Doerr
2011/0235971 A1     9/2011   Hashimoto
(Continued)

FOREIGN PATENT DOCUMENTS

JP        H06-120613 A      4/1994
JP        2001-290114 A    10/2001
(Continued)

OTHER PUBLICATIONS

International Search Report issued in PCT/JP2021/044988; mailed Feb. 8, 2022.
(Continued)

*Primary Examiner* — James R Greece
(74) *Attorney, Agent, or Firm* — Studebaker Brackett PLLC

(57) ABSTRACT

An optical semiconductor device according to the disclosure includes a first cladding layer, a quantum well active layer provided on the first cladding layer, a second cladding layer provided on the quantum well active layer and having a conductive type different from a conductive type of the first cladding layer, a heater electrode provided on the second cladding layer, a bias control circuitry configured to heat the quantum well active layer by applying bias to the heater electrode to adjust a phase of light propagating through the quantum well active layer, and a reverse bias control circuitry configured to apply reverse bias to the quantum well active layer to adjust an amplitude of the light propagating through the quantum well active layer.

19 Claims, 8 Drawing Sheets

(58) Field of Classification Search
USPC .......................................................... 359/248
See application file for complete search history.

(56) References Cited

U.S. PATENT DOCUMENTS

| | | | |
|---|---|---|---|
| 2012/0008963 A1 | 1/2012 | Aruga et al. | |
| 2012/0229886 A1 | 9/2012 | Chen et al. | |
| 2012/0314277 A1 | 12/2012 | Matsuda et al. | |
| 2014/0112610 A1 | 4/2014 | Takagi | |
| 2014/0126913 A1 | 5/2014 | Nakamoto | |
| 2020/0241205 A1* | 7/2020 | Kojima .................. | H01S 5/142 |

FOREIGN PATENT DOCUMENTS

| | | | |
|---|---|---|---|
| JP | 2009-198881 A | 9/2009 | |
| JP | 2012-018316 A | 1/2012 | |
| JP | 2012-255929 A | 12/2012 | |
| JP | 2014-085501 A | 5/2014 | |
| JP | 2014-092680 A | 5/2014 | |
| JP | 2015-103620 A | 6/2015 | |
| JP | 2019-074642 A | 5/2019 | |
| KR | 10-2013-0118384 A | 10/2013 | |

OTHER PUBLICATIONS

Office Action issued in JP 2022-517404; mailed by the Japanese Patent Office on May 24, 2022.
Office Action issued in TW 111145205; mailed by the Taiwan Intellectual Property Office on Aug. 31, 2023.
Office Action issued in KR 10-2024-7013226; mailed by the Korean Intellectual Property Office on Nov. 13, 2024.

* cited by examiner

FIG.5

OPTICAL SEMICONDUCTOR DEVICE, OPTICAL MODULATOR AND OPTICAL TRANSMISSION DEVICE

FIELD

The present disclosure relates to an optical semiconductor device, an optical modulator and an optical transmission device.

BACKGROUND

PTL 1 discloses an optical modulator. This optical modulator includes a first Mach-Zehnder (MZ) optical modulator and a second MZ optical modulator. An output of the first MZ optical modulator is amplified at a first optical amplifier with an amplification factor based on a first bias signal. An output of the second MZ optical modulator is amplified at a second optical amplifier with an amplification factor based on a second bias signal. A phase of an output of the second optical amplifier is rotated at an optical phase shifter. An output of the first optical amplifier and an output of the optical phase shifter are multiplexed at an optical multiplexer. A DC bias correction circuitry generates a first pulse signal and a second pulse signal that are complementary signals, and obtains a first bias value and a second bias value on the basis of intensity change of an output signal of the optical multiplexer. The first pulse signal is superimposed on the first bias signal, and the second pulse signal is superimposed on the second bias signal.

CITATION LIST

Patent Literature

[PTL 1] JP 2012-18316 A

SUMMARY

Technical Problem

Communication traffic has increased in accordance with expansion of cloud services. Further, it is expected that techniques such as Internet of Things (IoT) and the fifth generation mobile communication system which is called 5G will be spread, and artificial intelligence (AI), and the like, that process enormous amounts of data will also become widespread in society. This may cause a possibility that further higher-speed and further higher-capacity optical communication systems will be requested. To respond to these requests, there is a case where signals are provided to phases or polarized waves as well as intensity of light. By combining such a technique and a digital signal processing technique that enables compensation for phase noise and polarization fluctuation, stable long-distance transmission can be implemented. Such a digital coherent optical transmission technique has been put to practical use as an optical transmission scheme on the order of 100 Gbps.

Examples of a modulation scheme can include dual polarization quadrature phase shift keying (DP-QPSK) in which an optical signal is modulated in four different phases, and different signals are added to an X polarized wave and a Y polarized wave. To achieve further higher capacity, it is expected that a higher multilevel modulation scheme such as dual polarization 16 quadrature amplitude modulation (DP-16QAM) is applied.

The optical modulator in PTL 1 includes two MZ optical modulators to add independent signals to an amplitude and a phase of light. It is desirable that upon modulation at the optical modulators, differences in an amplitude level between an optical modulation signal of an I channel and an optical modulation signal of a Q channel are equal. Here, a semiconductor MZ type optical modulator typically performs phase modulation in a quantum confined Stark effect. In this event, an absorption amount changes at the same time a refractive index changes in accordance with voltage change of an RF modulation electrical signal. This may cause a possibility that variation occurs in a loss between two modulators. Thus, there is a possibility that an extinction ratio may deteriorate, and modulation waveform quality may degrade. Further, the optical phase shifter typically performs phase adjustment by a carrier plasma effect through application of currents. In this event, outputs of the modulators become asymmetric by carrier absorption. Thus, a difference occurs in an amplitude level between the two optical modulators, which may lead to degradation of modulation waveform quality.

To address this, in the optical modulator in PTL 1, an optical signal attenuated by way of the first MZ optical modulator and an optical signal attenuated by way of the second MZ optical modulator are amplified with individual amplification factors. This can reduce a difference in an amplitude level between the modulators. However, in PTL 1, there is a possibility that a length of the optical modulator may increase as a result of combination use of the optical amplifier and the phase shifter.

The present disclosure is directed to providing an optical semiconductor device capable of making an optical modulator or an optical transmission device smaller, the optical modulator and the optical transmission device.

Solution to Problem

An optical semiconductor device according to the first disclosure includes a first cladding layer; a quantum well active layer provided on the first cladding layer; a second cladding layer provided on the quantum well active layer and having a conductive type different from a conductive type of the first cladding layer; a heater electrode provided on the second cladding layer; a bias control circuitry configured to heat the quantum well active layer by applying bias to the heater electrode to adjust a phase of light propagating through the quantum well active layer; and a reverse bias control circuitry configured to apply reverse bias to the quantum well active layer to adjust an amplitude of the light propagating through the quantum well active layer.

An optical semiconductor device according to the second disclosure includes a first cladding layer; a quantum well active layer provided on the first cladding layer; a second cladding layer provided on the quantum well active layer; an oxide film provided on the second cladding layer; a heater electrode provided on the oxide film; a bias control circuitry configured to heat the quantum well active layer by applying bias to the heater electrode to adjust a phase of light propagating through the quantum well active layer; and a reverse bias control circuitry configured to apply reverse bias to the quantum well active layer to adjust an amplitude of the light propagating through the quantum well active layer.

Advantageous Effects of Invention

An optical semiconductor device according to the present disclosure can adjust a phase and an amplitude, so that it is not necessary to use an optical amplifier and a phase shifter in combination. It is therefore possible to make an optical modulator or an optical transmission device smaller.

BRIEF DESCRIPTION OF DRAWINGS

FIG. 5 is a view illustrating a configuration of an optical transmission device according to a comparative example.

DESCRIPTION OF EMBODIMENTS

Figure 1:
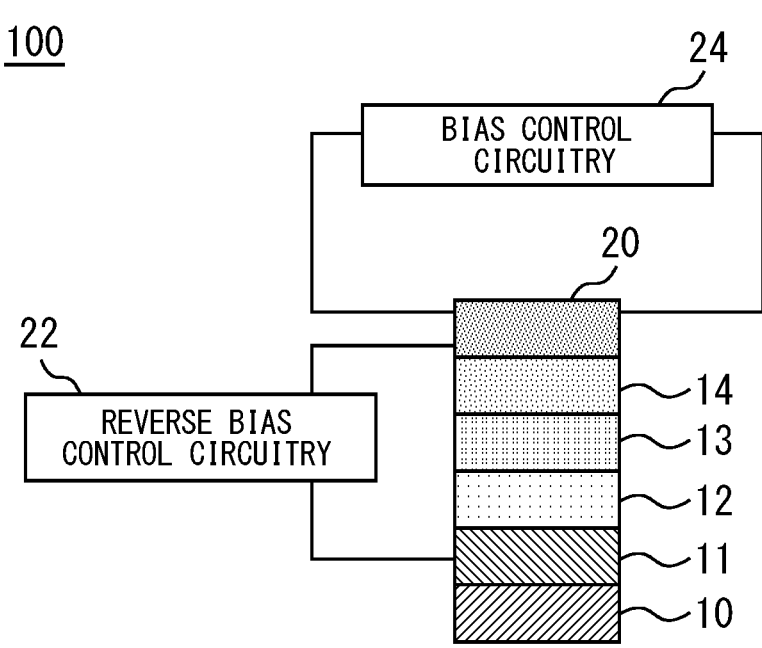
FIG. 1 is a cross-sectional view of an optical semiconductor device according to a first embodiment.

An optical semiconductor device, an optical modulator and an optical transmission device according to each embodiment will be described with reference to drawings. Identical or corresponding constitutional elements are given the same reference numerals, and the repeated description of such constitutional elements may be omitted.

First Embodiment

FIG. 1 is a cross-sectional view of an optical semiconductor device 100 according to a first embodiment. The optical semiconductor device 100 is an integrated waveguide in which an amplitude adjustment function and a phase adjustment function are integrally integrated. The optical semiconductor device 100 includes a substrate 10. The substrate 10 is, for example, a semi-insulating semiconductor substrate formed with Fe—InP. A p-type semiconductor heat insulating layer 11 is provided on the substrate 10. The semiconductor heat insulating layer 11 is, for example, formed with p-type InGaAs.

A p-type cladding layer 12 is provided on the semiconductor heat insulating layer 11. The cladding layer 12 is, for example, formed with p-type InP. A quantum well active layer 13 is provided on the cladding layer 12. The quantum well active layer 13 is, for example, formed with an AlGaInAs mixed crystal. An n-type cladding layer 14 is provided on the quantum well active layer 13. The cladding layer 14 is, for example, formed with n-type InP or n-type InGaAs.

A heater electrode 20 is provided on the cladding layer 14. The heater electrode 20 is, for example, a thin-film heater electrode for a thermos-optical phase shifter. A bias control circuitry 24 is a bias control circuitry for a thermos-optical phase shifter. The bias control circuitry 24 heats the quantum well active layer 13 by applying bias to the heater electrode 20 to adjust a phase of light propagating through the quantum well active layer 13. As the heater electrode 20 and the bias control circuitry 24, any configuration that can heat the quantum well active layer 13 can be employed.

A reverse bias control circuitry 22 has a positive electrode connected to the heater electrode 20 and a negative electrode connected to the semiconductor heat insulating layer 11. The reverse bias control circuitry 22 applies reverse bias to the quantum well active layer 13 to adjust an amplitude of light propagating through the quantum well active layer 13. Note that, for example, the positive electrode of the reverse bias control circuitry 22 may be connected to the cladding layer 14, and the negative electrode may be connected to the cladding layer 12. As the reverse bias control circuitry 22, any configuration that can apply reverse bias to the quantum well active layer 13 can be employed.

Figure 2:
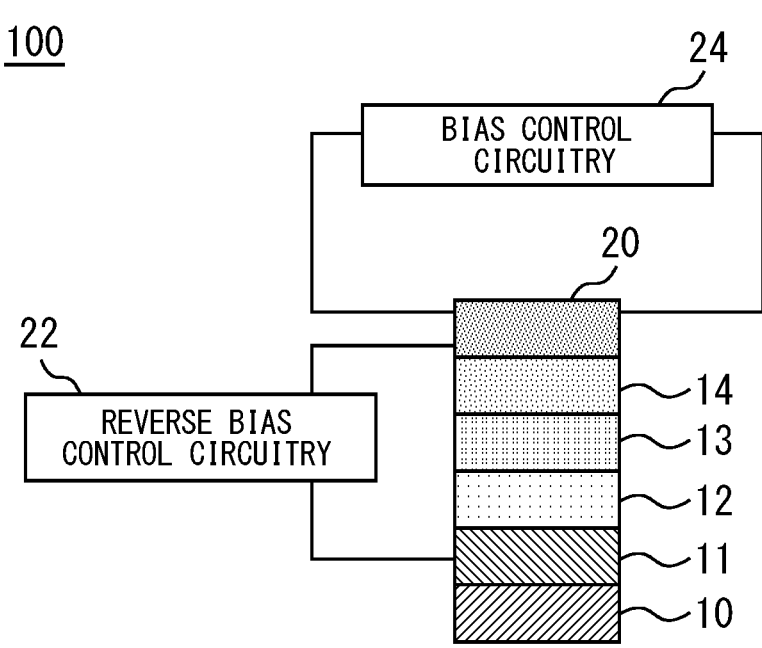
FIG. 2 is a view illustrating a band structure when the optical semiconductor device according to the first embodiment is in a thermal equilibrium state.
Figure 3:
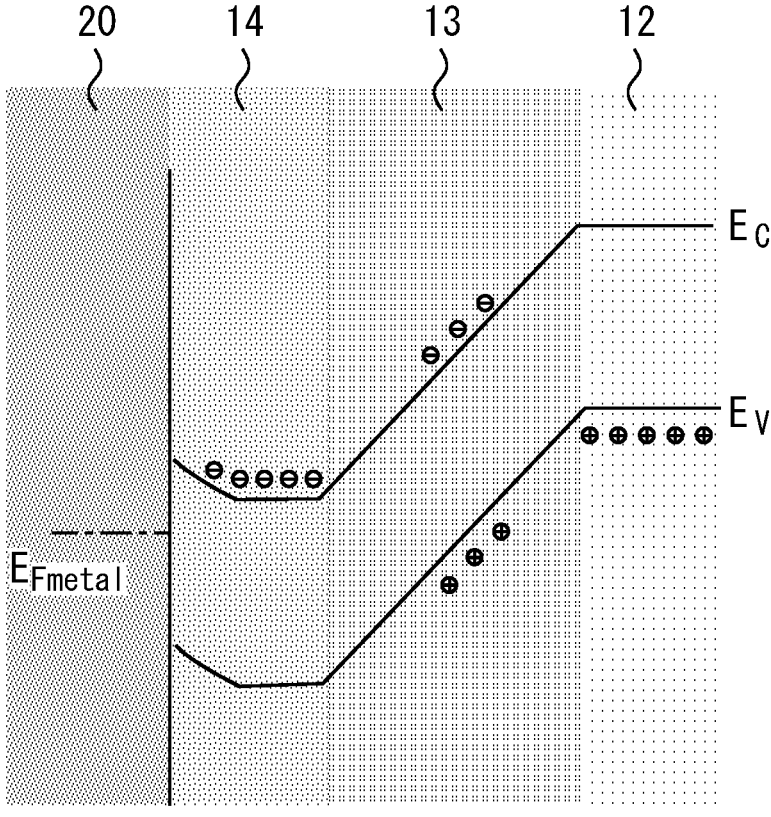
FIG. 3 is a view illustrating a band structure when reverse bias is applied in the optical semiconductor device according to the first embodiment.

FIG. 2 is a view illustrating a band structure when the optical semiconductor device 100 according to the first embodiment is in a thermal equilibrium state. FIG. 3 is a view illustrating a band structure when reverse bias is applied in the optical semiconductor device 100 according to the first embodiment. Operation of the optical semiconductor device 100 will be described. First, phase adjustment will be described. By the bias control circuitry 24 applying bias to the heater electrode 20, the quantum well active layer 13 is heated. In this event, a phase of light propagating through the quantum well active layer 13 can be adjusted to a target phase by change of a refractive index by a thermo-optical effect. Note that the semiconductor heat insulating layer 11 is provided to enhance phase shifting efficiency by the thermo-optical effect.

Next, adjustment of an amplitude will be described. It is difficult to control an amplitude level only by the bias control circuitry 24 applying bias to the heater electrode 20. In the present embodiment, an amplitude adjustment unit including the substrate 10, the semiconductor heat insulating layer 11, the cladding layer 12, the quantum well active layer 13 and the cladding layer 14 is integrated under the heater electrode 20. By this means, a phase and an amplitude can be adjusted at the same time. The reverse bias control circuitry 22 changes the band structure from the band structure in a thermal equilibrium state illustrated in FIG. 2 to the band structure when reverse bias is applied illustrated in FIG. 3 by application of reverse bias. By this means, an amplitude of light propagating through the quantum well active layer 13 can be adjusted to a target amplitude level by light absorption by a quantum confined Stark effect.

Figure 4:
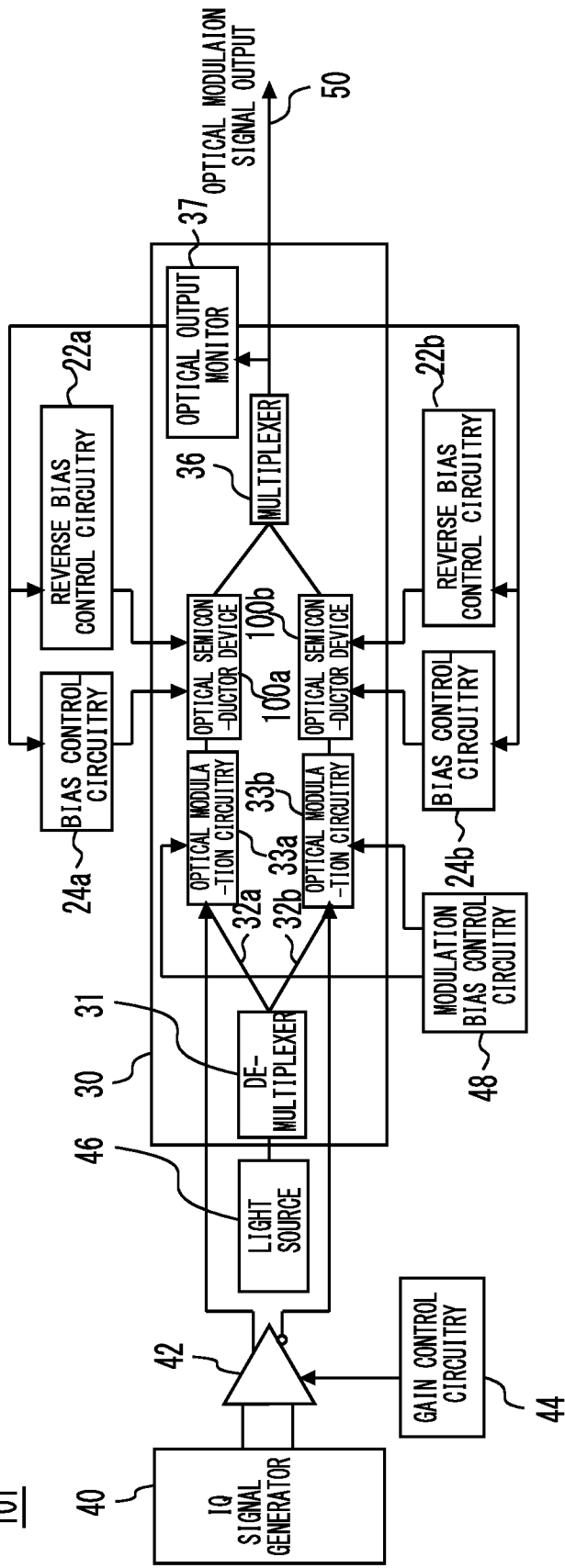
FIG. 4 is a view illustrating a configuration of an optical transmission device according to the first embodiment.

FIG. 4 is a view illustrating a configuration of an optical transmission device 101 according to the first embodiment. The optical transmission device 101 includes a light source 46 such as a laser, an MZ type optical modulator 30, an IQ signal generator 40, a driver 42 that is an IQ signal amplification circuitry, a gain control circuitry 44, a modulation bias control circuitry 48, and an optical output waveguide 50. Further, the MZ type optical modulator 30 includes a demultiplexer 31, optical waveguides 32a and 32b, optical modulation circuitries 33a and 33b, optical semiconductor devices 100a and 100b, a multiplexer 36, and an optical output monitor 37. The MZ type optical modulator 30 includes the optical semiconductor devices 100a and 100b as two optical semiconductor devices 100. The optical modulation circuitries 33a and 33b are Mach-Zehnder type interferometers. The optical modulation circuitries 33a and 33b are not limited to this, and optical modulators other than the Mach-Zehnder type may be used.

The optical modulation circuitries 33a and 33b are, for example, formed with a compound semiconductor such as lithium niobate (LiNbO3) or indium phosphide (InP). In a case where lithium niobate is used, phase modulation is performed while a refractive index within a waveguide is changed by a Pockels effect. In this case, while an advantage of small light absorption and small temperature dependency can be obtained, high frequency characteristics become a problem. On the other hand, in the compound semiconductor, phase modulation can be performed by a quantum confined Stark effect. In this case, excellent high frequency characteristics can be obtained because of high mobility. Further, the compound semiconductor excels in integration, so that the MZ type optical modulator 30 can be made smaller. As well as the optical modulation circuitries 33a and 33b, the optical waveguides, the optical semiconductor devices 100a and 100b, the demultiplexer 31, the multiplexer 36, the optical output monitor 37, the light source 46, and the like, may be integrally formed on the compound semiconductor. By employing a structure in which elements are connected with the optical waveguides, the optical transmission device 101 that is small and integrated can be formed.

The optical waveguide 32a, the optical modulation circuitry 33a, and the optical semiconductor device 100a constitute a first arm. The optical waveguide 32b, the optical modulation circuitry 33b, and the optical semiconductor device 100b constitute a second arm. Light output from the light source 46 is made to branch into the first arm and the second arm by the demultiplexer 31. The optical modulation circuitry 33a generates a first optical modulation signal, and the optical modulation circuitry 33b generates a second optical modulation signal. The first optical modulation signal is input to the optical semiconductor device 100a, and the second optical modulation signal is input to the optical semiconductor device 100b. The multiplexer 36 multiplexes an output signal of the optical semiconductor device 100a and an output signal of the optical semiconductor device 100b. In this manner, light output from the first arm and light output from the second arm are multiplexed and output to outside via the optical output waveguide 50.

The driver 42 amplifies a differential modulation signal generated by the IQ signal generator 40 with a gain controlled by the gain control circuitry 44. Multilevel signals input from the IQ signal generator 40 may be modulated in any modulation scheme. The optical modulation circuitry 33a changes a waveguide refractive index of the input optical signal on the basis of an I channel modulation signal input from the IQ signal generator 40 and a bias signal input from the modulation bias control circuitry 48. By this means, the optical modulation circuitry 33a modulates a phase of an optical signal that passes through the optical modulation circuitry 33a and outputs the modulated optical signal to the optical semiconductor device 100a. The optical semiconductor device 100a adjusts the input optical signal with a phase rotation rate and an attenuation rate determined on the basis of the bias signals from the bias control circuitry 24a and the reverse bias control circuitry 22a. The adjusted optical signal is output to the multiplexer 36.

The optical modulation circuitry 33b changes a waveguide refractive index of the input optical signal on the basis of a Q channel modulation signal input from the IQ signal generator 40 and the bias signal input from the modulation bias control circuitry 48. By this means, the optical modulation circuitry 33b modulates a phase of the optical signal that passes through the optical modulation circuitry 33b and outputs the modulated optical signal to the optical semiconductor device 100b. The optical semiconductor device 100b adjusts the input optical signal with a phase rotation rate and an attenuation rate determined on the basis of the bias signals from the bias control circuitry 24b and the reverse bias control circuitry 22b. The adjusted optical signal is output to the multiplexer 36.

The optical output monitor 37 monitors an output signal of the multiplexer 36. In the optical semiconductor devices 100a and 100b, the bias of the bias control circuitries 24a and 24b and the reverse bias of the reverse bias control circuitries 22a and 22b are adjusted in accordance with a detection signal of the optical output monitor 37. Specifically, the phases are adjusted in the optical semiconductor devices 100a and 100b on the basis of the optical signal detected by the optical output monitor 37 so that a phase difference between the optical signals output from the optical semiconductor device 100a and the optical semiconductor device 100b becomes $\pi/2$. Further, amplitudes are adjusted in the optical semiconductor devices 100a and 100b on the basis of the optical signal detected by the optical output monitor 37 so that the optical signals output from the optical semiconductor devices 100a and 100b have nearly equal amplitude levels.

In the present embodiment, the phase and the amplitude of light can be adjusted in the optical semiconductor device 100. Thus, even in a case where variation occurs in a loss between the two optical modulation circuitries 33a and 33b, a difference in the amplitude level can be reduced to equal to or less than a fixed level. It is therefore possible to improve transmission waveform quality.

Figure 5:
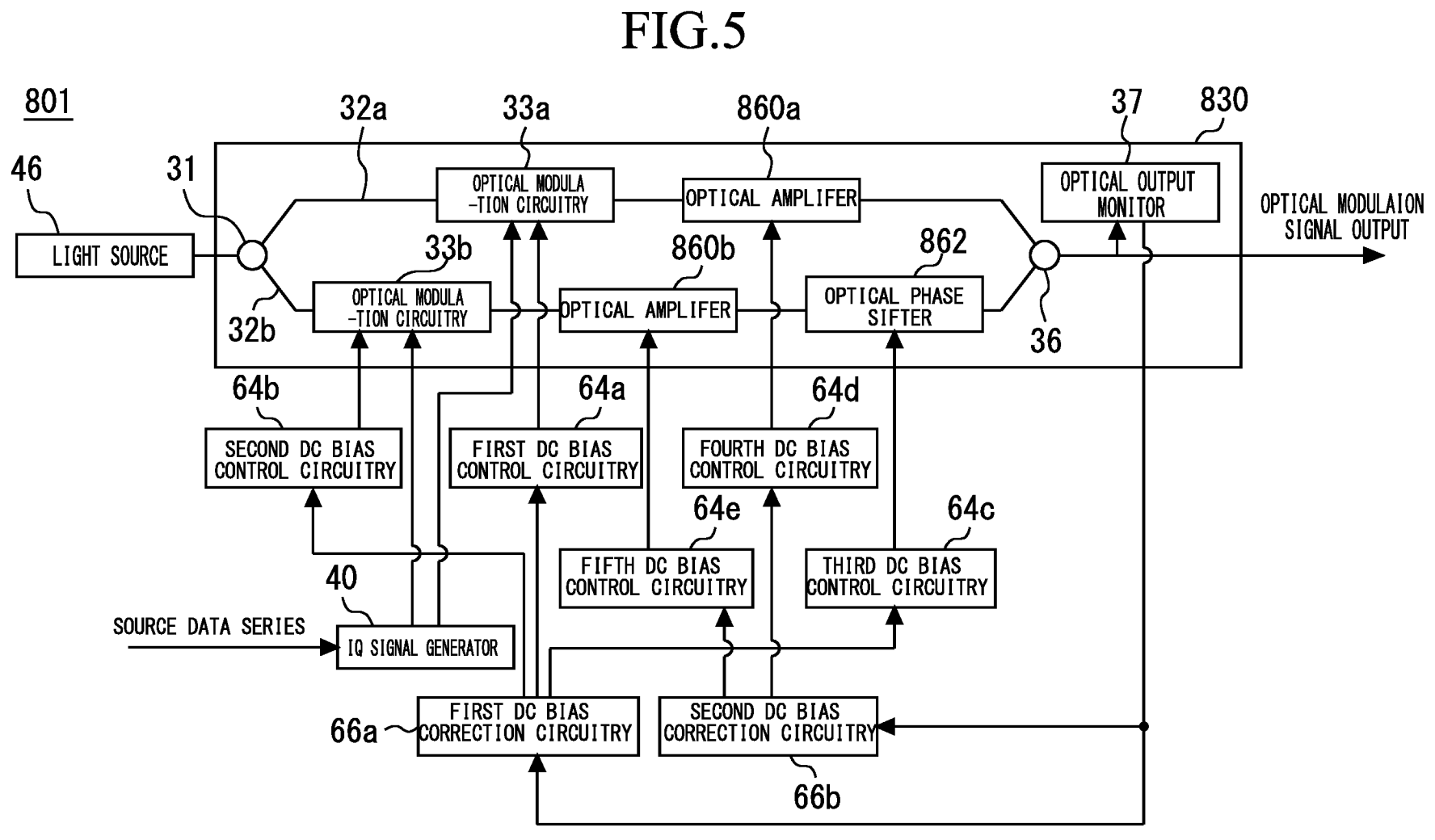

FIG. 5 is a view illustrating a configuration of an optical transmission device 801 according to a comparative example. The optical transmission device 801 includes the light source 46, an MZ type optical modulator 830, the IQ signal generator 40, first to fifth direct current (DC) bias control circuitries 64a to 64e, and first and second DC bias correction circuitries 66a and 66b. The MZ type optical modulator 830 includes the demultiplexer 31, the optical waveguides 32a and 32b, the optical modulation circuitries 33a and 33b, optical amplifiers 860a and 860b, an optical phase shifter 862, the multiplexer 36, and the optical output monitor 37.

Traveling-wave electrodes to which RF modulation electrical signals for performing modulation operation on the optical signals that propagate within the optical waveguides are to be input are provided in the optical modulation circuitries 33a and 33b. A phase difference between the optical modulation signals of two systems whose phases are modulated by an electro-optic effect is adjusted to be $\pi/2$ using the optical phase shifter 862. By multiplexing the optical modulation signals of two systems and making the optical modulation signals of two systems interfere with each other, a modulation signal such as a QPSK signal is generated. Further, by performing these for each polarized wave, a DP-QPSK signal can be generated. Still further, by increasing the number of phase modulation circuitries, further multilevel modulation can be performed.

The demultiplexer 31 demultiplexes an optical signal emitted from the light source 46 into two optical signals. One optical signal out of the demultiplexed optical signals is input to the optical modulation circuitry 33a, and the other optical signal is input to the optical modulation circuitry 33*b*. The optical modulation circuitry 33*a* modulates the input optical signal on the basis of the I channel modulation signal input from the IQ signal generator 40 and a bias signal input from the first DC bias control circuitry 64*a*. This bias signal may be a bias current. The optical amplifier 860*a* amplifies the optical signal input from the optical modulation circuitry 33*a* with an amplification factor determined on the basis of a bias signal input from the fourth DC bias control circuitry 64*d*.

The optical modulation circuitry 33*b* modulates the input optical signal on the basis of the Q channel modulation signal input from the IQ signal generator 40 and a bias signal input from the second DC bias control circuitry 64*b*. The optical amplifier 860*b* amplifies the input optical signal with an amplification factor determined on the basis of a bias signal input from the fifth DC bias control circuitry 64*e*. The amplified optical signal is input to the optical phase shifter 862. The optical phase shifter 862 rotates a phase of the input optical signal by $\pi/2$ on the basis of a bias signal input from the third DC bias control circuitry 64*c*.

The optical amplifiers 860*a* and 860*b* determine amplification factors set to themselves on the basis of the bias signal. For example, if the input bias signal is smaller than a reference value determined in advance, a negative amplification factor is set so as to attenuate the input optical signal. The reference value is, for example, a value corresponding to the amplification factor of 1. Further, if the input bias signal is greater than the reference value, a positive amplification factor is set so as to amplify the input signal. As the value of the bias signal is grater, the amplification factor becomes greater. Further, the bias signals of the first to the fifth DC bias control circuitries 64*a* to 64*e* are corrected at the first and the second DC bias correction circuitries 66*a* and 66*b* on the basis of the detection signal of the optical output monitor 37.

In the MZ type optical modulator 830, the optical signal attenuated by way of the optical modulation circuitry 33*a* and the optical signal attenuated by way of the optical modulation circuitry 33*b* are amplified with individual amplification factors through such operation. This can reduce a difference in the amplitude level between the modulators. However, in the MZ type optical modulator 830 according to the comparative example, there is a possibility that a length of the optical modulator increases due to combination use of the optical amplifiers 860*a* and 860*b* and the optical phase shifter 862.

In contrast, in the present embodiment, the phase and the amplitude can be adjusted in the optical semiconductor device 100. Thus, it is not necessary to use the optical amplifier and the phase shifter in combination, so that it is possible to make the MZ type optical modulator 30 and the optical transmission device 101 smaller.

Figure 6:
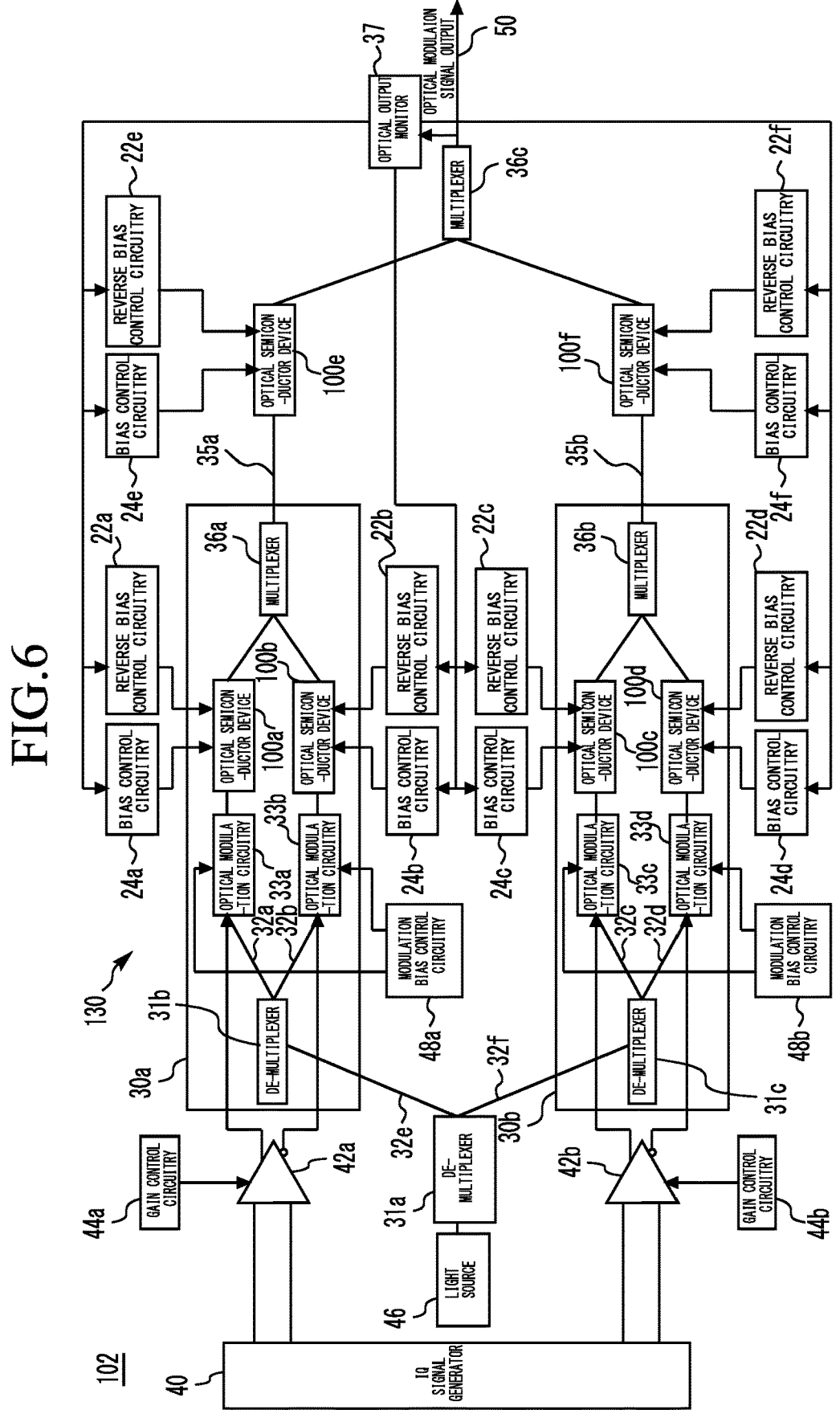
FIG. 6 is a view illustrating a configuration of an optical transmission device according to a modification of the first embodiment.

FIG. 6 is a view illustrating a configuration of an optical transmission device 102 according to a modification of the first embodiment. The optical transmission device 102 includes an optical modulator 130 including two MZ type optical modulators 30*a* and 30*b*. The optical modulator 130 includes optical semiconductor devices 100*a* to 100*f* as the optical semiconductor device 100. Light output from the light source 46 branches into the optical waveguides 32*e* and 32*f* by the demultiplexer 31*a*. Light propagating through the optical waveguide 32*e* branches into the optical waveguides 32*a* and 32*b* by the demultiplexer 31*b* at the MZ type optical modulator 30*a*. Light propagating through the optical waveguide 32*f* branches into the optical waveguides 32*c* and 32*d* by the demultiplexer 31*c* at the MZ type optical modulator

30*b*. The optical waveguides 32*a* to 32*d* are respectively connected to the optical modulation circuitries 33*a* to 33*d*.

The optical modulator 130 includes the optical modulation circuitry 33*a* that generates a first optical modulation signal, the optical modulation circuitry 33*b* that generates a second optical modulation signal, the optical modulation circuitry 33*c* that generates a third optical modulation signal, and the optical modulation circuitry 33*d* that generates a fourth optical modulation signal. The optical modulation circuitries 33*a* to 33*d* are Mach-Zehnder type interferometers. The optical modulation circuitries 33*a* to 33*d* may be optical modulators other than MZ type optical modulators. The first optical modulation signal is input to the optical semiconductor device 100*a*. The second optical modulation signal is input to the optical semiconductor device 100*b*. The third optical modulation signal is input to the optical semiconductor device 100*c*. The fourth optical modulation signal is input to the optical semiconductor device 100*d*.

The multiplexer 36*a* multiplexes output signals of the optical semiconductor devices 100*a* and 100*b*. The multiplexer 36*b* multiplexes output signals of the optical semiconductor devices 100*c* and 100*d*. An output signal of the multiplexer 36*a* is input to the optical semiconductor device 100*e*, and an output signal of the multiplexer 36*b* is input to the optical semiconductor device 100*f*. The multiplexer 36*c* multiplexes an output signal of the optical semiconductor device 100*e* and an output signal of the optical semiconductor device 100*f*. The multiplexed signal is output to outside by way of the optical output waveguide 50.

The optical output monitor 37 in the optical transmission device 102 monitors output signals of the multiplexer 36*a*, the multiplexer 36*b*, and the multiplexer 36*c*. In the optical semiconductor devices 100*a* to 100*f*, the bias of the bias control circuitry 24 and the reverse bias of the reverse bias control circuitry 22 are adjusted in accordance with the detection signal of the optical output monitor 37.

The drivers 42*a* and 42*b* amplify a differential modulation signal generated by the IQ signal generator 40 respectively with gains controlled by the gain control circuitries 44*a* and 44*b*. The optical modulation circuitry 33*a* changes a waveguide refractive index of the input optical signal on the basis of the I channel modulation signal input from the IQ signal generator 40 and the bias signal input from the modulation bias control circuitry 48*a*. By this means, the optical modulation circuitry 33*a* modulates a phase of the optical signal that passes through the optical modulation circuitry 33*a*. The optical semiconductor device 100*a* adjusts the optical signal input from the optical modulation circuitry 33*a* with a phase rotation rate and an attenuation rate determined on the basis of the bias signals input from the bias control circuitry 24*a* and the reverse bias control circuitry 22*a*.

The optical modulation circuitry 33*b* changes the waveguide refractive index of the input optical signal on the basis of the I channel modulation signal input from the IQ signal generator 40 and the bias signal input from the modulation bias control circuitry 48*a*. By this means, the optical modulation circuitry 33*b* modulates a phase of the optical signal that passes through the optical modulation circuitry 33*b*. The optical semiconductor device 100*b* adjusts the optical signal input from the optical modulation circuitry 33*b* with a phase rotation rate and an attenuation rate determined on the basis of the bias signals input from the bias control circuitry 24*b* and the reverse bias control circuitry 22*b*.

The optical semiconductor devices 100*a* and 100*b* adjust phases on the basis of the optical signal detected by the optical output monitor 37 so that a phase difference between the optical signals output from the optical semiconductor devices 100a and 100b become π/2. Further, the optical semiconductor devices 100a and 100b adjust amplitudes on the basis of the optical signal detected by the optical output monitor 37 so that the optical signals output from the optical semiconductor devices 100a and 100b have nearly equal amplitude levels.

The optical modulation circuitry 33c changes a waveguide refractive index of the input optical signal on the basis of the Q channel modulation signal input from the IQ signal generator 40 and the bias signal input from the modulation bias control circuitry 48b. By this means, the optical modulation circuitry 33c modulates a phase of the optical signal that passes through the optical modulation circuitry 33c. The optical semiconductor device 100c adjusts the optical signal input from the optical modulation circuitry 33c with a phase rotation rate and an attenuation rate determined on the basis of the bias signals input from the bias control circuitry 24c and the reverse bias control circuitry 22c.

The optical modulation circuitry 33d changes a waveguide refractive index of the input optical signal on the basis of the Q channel modulation signal input from the IQ signal generator 40 and the bias signal input from the modulation bias control circuitry 48b. By this means, the optical modulation circuitry 33d modulates a phase of the optical signal that passes through the optical modulation circuitry 33d. The optical semiconductor device 100d adjusts the optical signal input from the optical modulation circuitry 33d with a phase rotation rate and an attenuation rate determined on the basis of the bias signals input from the bias control circuitry 24d and the reverse bias control circuitry 22d.

The optical semiconductor devices 100c and 100d adjust phases on the basis of the optical signal detected by the optical output monitor 37 so that a phase difference between the optical signals output from the optical semiconductor devices 100c and 100d become π/2. Further, the optical semiconductor devices 100c and 100d adjust amplitudes on the basis of the optical signal detected by the optical output monitor 37 so that the optical signals output from the optical semiconductor devices 100c and 100d have nearly equal amplitude levels.

The optical signal is input to the optical semiconductor device 100e from the multiplexer 36a via the optical waveguide 35a. The optical semiconductor device 100e adjusts the input optical signal with a phase rotation rate and an attenuation rate determined on the basis of the bias signals input from the bias control circuitry 24e and the reverse bias control circuitry 22e. The optical signal is input to the optical semiconductor device 100f from the multiplexer 36b via the optical waveguide 35b. The optical semiconductor device 100f adjusts the input optical signal with a phase rotation rate and an attenuation rate determined on the basis of the bias signals input from the bias control circuitry 24f and the reverse bias control circuitry 22f.

The optical semiconductor devices 100e and 100f adjust phases on the basis of the optical signal detected by the optical output monitor 37 so that a phase difference between the optical signals output from the optical semiconductor devices 100e and 100f become π/2. Further, the optical semiconductor devices 100e and 100f adjust amplitudes on the basis of the optical signal detected by the optical output monitor 37 so that the optical signals output from the optical semiconductor devices 100e and 100f have nearly equal amplitude levels.

In the optical transmission device 102, even in a case where variation occurs in a loss between a plurality of MZ type optical modulators 30a and 30b, a difference in the amplitude level can be reduced to equal to or less than a fixed level.

Conductive types of the respective layers may be switched. In other words, the conductive type of the cladding layer 12 may be one of the n type and the p type, and the cladding layer 14 only requires to have a conductive type different from the conductive type of the cladding layer 12, out of the n type and the p type. Note that in a case where the conductive types are switched, the applied bias is switched between positive and negative. Further, the conductive type of the semiconductor heat insulating layer 11 is preferably the same as the conductive type of the cladding layer 12.

These modifications can be applied, as appropriate, to optical semiconductor devices, optical modulators and optical transmission devices according to the following embodiments. Note that the optical semiconductor devices, the optical modulators and the optical transmission devices according to the following embodiments are similar to those of the first embodiment in many respects, and thus differences between the optical semiconductor devices, the optical modulators and the optical transmission devices according to the following embodiments and those of the first embodiment will be mainly described below.

Second Embodiment

Figure 7:
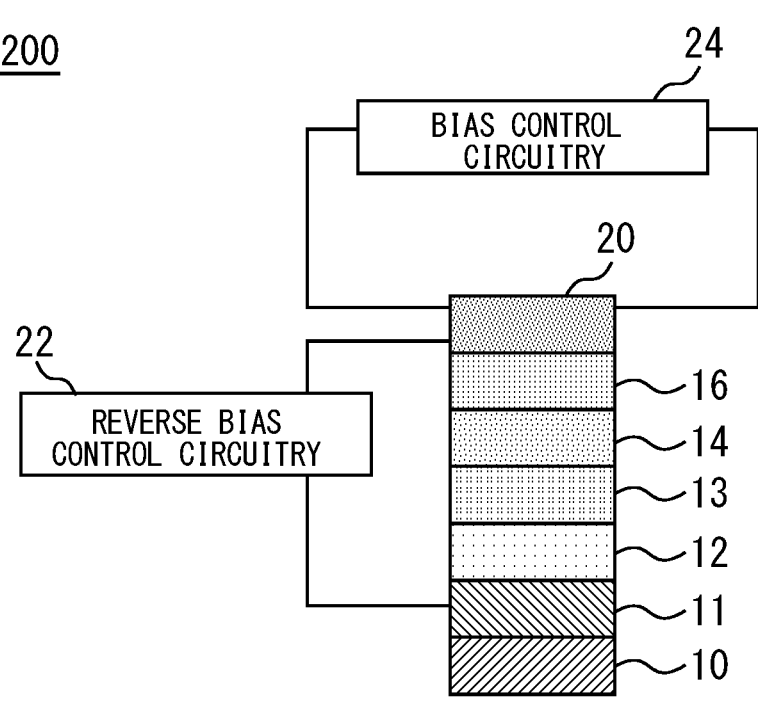
FIG. 7 is a cross-sectional view of an optical semiconductor device according to a second embodiment.

FIG. 7 is a cross-sectional view of an optical semiconductor device 200 according to a second embodiment. The optical semiconductor device 200 includes an oxide film 16 provided on the cladding layer 14. The heater electrode 20 is provided on the oxide film 16. Other configurations are similar to the configurations in the first embodiment. The oxide film 16 is formed with SiO2, or the like.

Figure 8:
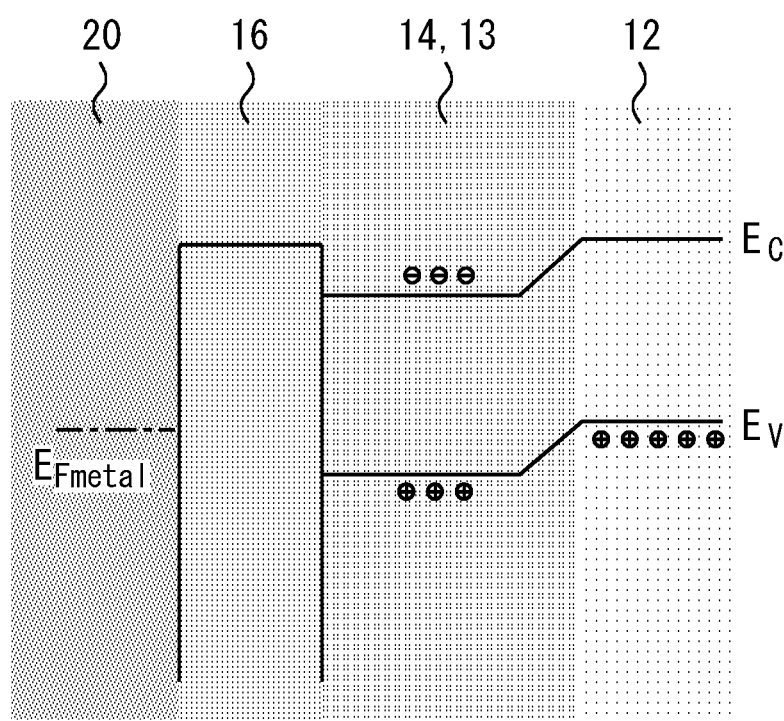
FIG. 8 is a view illustrating a band structure when the optical semiconductor device according to the second embodiment is in a thermal equilibrium state.
Figure 9:
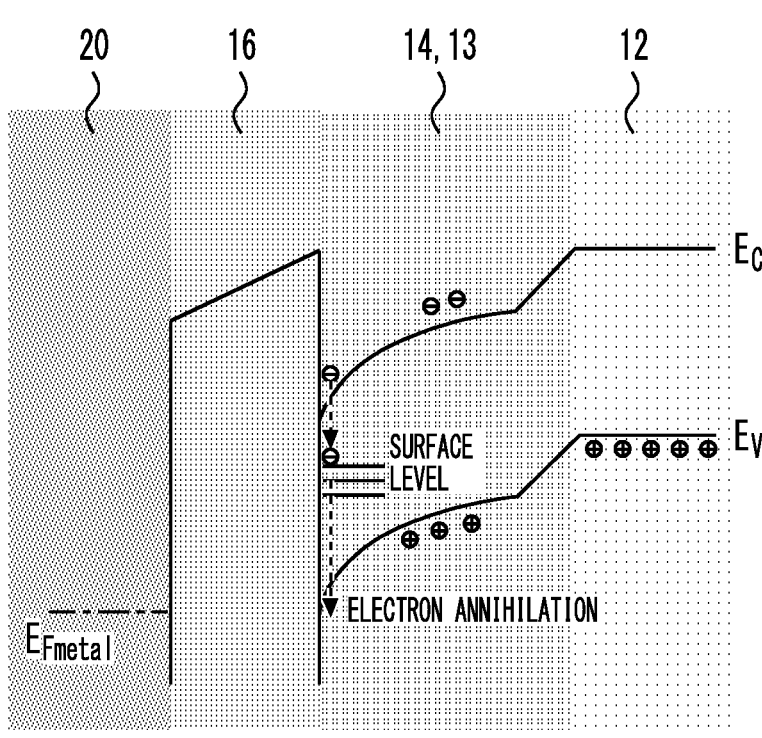
FIG. 9 is a view illustrating a band structure when reverse bias is applied in the optical semiconductor device according to the second embodiment.

FIG. 8 is a view illustrating a band structure when the optical semiconductor device 200 according to the second embodiment is in a thermal equilibrium state. FIG. 9 is a view illustrating a band structure when reverse bias is applied in the optical semiconductor device 200 according to the second embodiment. Operation of the optical semiconductor device 200 will be described. The bias control circuitry 24 applies bias to the heater electrode 20. This changes a refractive index of the quantum well active layer 13 by a thermo-optical effect, so that the phase can be adjusted to a target phase. Further, the reverse bias control circuitry 22 applies reverse bias to the quantum well active layer 13. This changes the band structure as illustrated in FIG. 9. In this event, the amplitude can be adjusted to a target amplitude level by light absorption by a quantum confined Stark effect.

In the present embodiment, the oxide film 16 is provided between a metal and a semiconductor to form a MOS type structure. This can reduce thermal instability, variation upon manufacturing and change over the time after manufacturing due to chemical reaction at an interface between the metal and the semiconductor. In other words, it is possible to prevent degradation of reliability in a case where the metal is brought into contact with the semiconductor, in addition to the effect of the first embodiment.

The conductive types of the respective layers may be switched. Further, in the present embodiment, the conductive type of the cladding layer 12 may be different from or the same as the conductive type of the cladding layer 14. Note that the conductive type of the semiconductor heat insulating layer 11 is preferably the same as the conductive type of the cladding layer 12.

Third Embodiment

Figure 10:
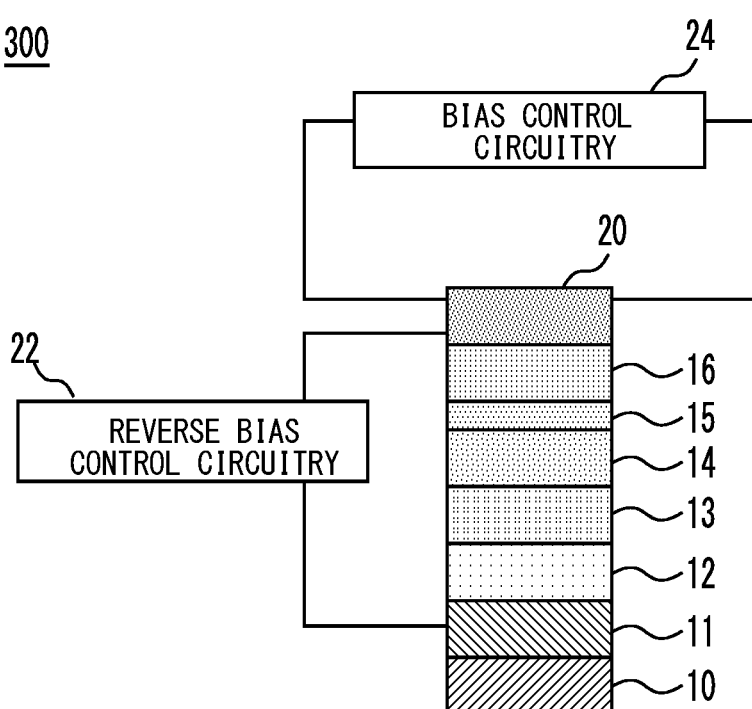
FIG. 10 is a cross-sectional view of an optical semiconductor device according to a third embodiment.

FIG. 10 is a cross-sectional view of an optical semiconductor device 300 according to a third embodiment. The optical semiconductor device 300 includes a p-type cladding layer 15 provided between the cladding layer 14 and the oxide film 16. Other configurations are similar to the configurations in the second embodiment. The cladding layer 15 is, for example, formed with p-type InP. There is no limit in a thickness of the cladding layer 15, and the cladding layer 15 may be thinner than the cladding layer 14 or may have a thickness nearly equal to the thickness of the cladding layer 14. In a case where the cladding layer 15 is thinner than the cladding layer 14, doping concentration is preferably made higher than doping concentration of the cladding layer 14. For example, in a case where the thickness of the cladding layer 15 is 50 nm, the doping concentration is preferably approximately $1\times10^{18}$.

Figure 11:
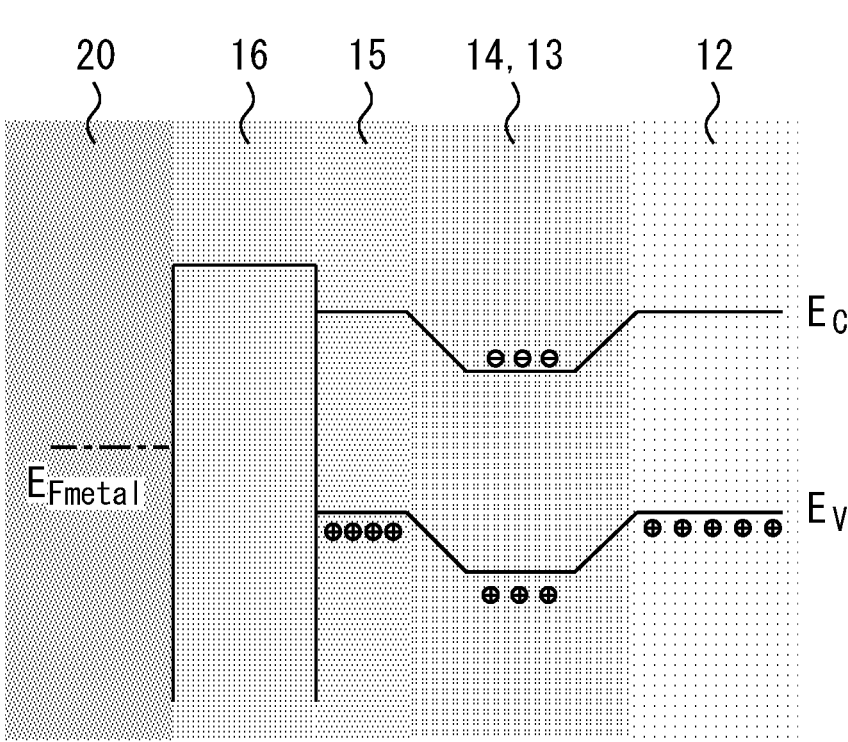
FIG. 11 is a view illustrating a band structure when the optical semiconductor device according to the third embodiment is in a thermal equilibrium state.
Figure 12:
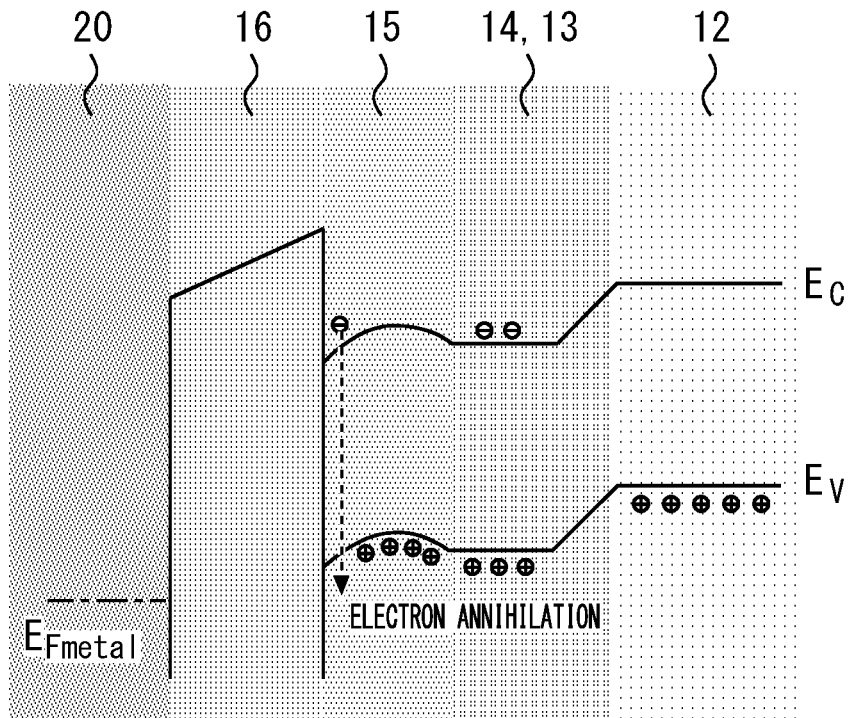
FIG. 12 is a view illustrating a band structure when reverse bias is applied in the optical semiconductor device according to the third embodiment.

FIG. 11 is a view illustrating a band structure when the optical semiconductor device 300 according to the third embodiment is in a thermal equilibrium state. FIG. 12 is a view illustrating a band structure when reverse bias is applied in the optical semiconductor device 300 according to the third embodiment. Operation of the optical semiconductor device 300 according to the present embodiment will be described. The bias control circuitry 24 applies bias to the heater electrode 20. This changes a refractive index of the quantum well active layer 13 by a thermo-optical effect, so that the phase can be adjusted to a target phase. Further, the reverse bias control circuitry 22 applies reverse bias to the quantum well active layer 13. This changes the band structure as illustrated in FIG. 12. In this event, the amplitude level can be adjusted to a target amplitude level by light absorption by a quantum confined Stark effect.

In the present embodiment, the p-type cladding layer 15 is provided between the oxide film 16 and the cladding layer 14 which is, for example, the n type. This can encourage electron annihilation, so that it is possible to prevent increase in an amount of application of reverse bias by carriers trapped on an oxide film interface, in addition to the effect of the second embodiment.

The conductive types of the respective layers may be switched. Further, in the present embodiment, the conductive type of the cladding layer 12 may be different from or the same as the conductive type of the cladding layer 14. Note that the conductive type of the semiconductor heat insulating layer 11 is preferably the same as the conductive type of the cladding layer 12. The conductive type of the cladding layer 15 only requires to be different from the conductive type of the cladding layer 14.

Further, the optical semiconductor device 200 or 300 according to the second embodiment or the third embodiment may be applied to one of the optical semiconductor devices 100a to 100f provided in the optical transmission devices 101 and 102 of the first embodiment.

Note that the technical features described in the above embodiments may be combined as appropriate.

REFERENCE SIGNS LIST

10 substrate, 11 semiconductor heat insulating layer, 12 cladding layer, 13 quantum well active layer, 14 cladding layer, 15 cladding layer, 16 oxide film, 20 heater electrode 22, 22a~22f reverse bias control circuitry, 24,

24a~24f bias control circuitry, 30, 30a, 30b MZ type optical modulator, 31, 31a~31c demultiplexer, 32a~32f optical waveguide, 33a~33d optical modulation circuitry, 35a, 35b optical waveguide, 36, 36a~36c multiplexer, 37 optical output monitor, 40 IQ IQ signal generator, 42, 42a, 42b driver, 44, 44a, 44b gain control circuitry, 46 light source, 48, 48a, 48b modulation bias control circuitry, 50 optical output waveguide, 64a first DC bias control circuitry, 64b second DC bias control circuitry, 64c third DC bias control circuitry, 64d fourth DC bias control circuitry, 64e fifth DC bias control circuitry, 66a first DC bias correction circuitry, 66b second DC bias correction circuitry, 100, 100a~100f optical semiconductor device, 101, 102 optical transmission device, 130 optical modulator, 200, 300 optical semiconductor device, 801 optical transmission device, 830 MZ type optical modulator, 860a, 860b optical amplifier, 862 optical phase shifter

The invention claimed is:

1. An optical semiconductor device comprising:
a first cladding layer;
a quantum well active layer provided on the first cladding layer;
a second cladding layer provided on the quantum well active layer and having a conductive type different from a conductive type of the first cladding layer;
a heater electrode provided on the second cladding layer;
a bias control circuitry configured to heat the quantum well active layer by applying bias to the heater electrode to adjust a phase of light propagating through the quantum well active layer; and
a reverse bias control circuitry configured to apply reverse bias to a portion of the quantum well active layer directly below the heater electrode to adjust an amplitude of the light propagating through the quantum well active layer.

2. An optical semiconductor device comprising:
a first cladding layer;
a quantum well active layer provided on the first cladding layer;
a second cladding layer provided on the quantum well active layer;
an oxide film provided on the second cladding layer;
a heater electrode provided on the oxide film;
a bias control circuitry configured to heat the quantum well active layer by applying bias to the heater electrode to adjust a phase of light propagating through the quantum well active layer; and
a reverse bias control circuitry configured to apply reverse bias to a portion of the quantum well active layer directly below the heater electrode to adjust an amplitude of the light propagating through the quantum well active layer.

3. The optical semiconductor device according to claim 2, comprising a third cladding layer provided between the second cladding layer and the oxide film and having a conductive type different from a conductive type of the second cladding layer.

4. An optical modulator comprising:
a first optical modulation circuitry configured to generate a first optical modulation signal;
a second optical modulation circuitry configured to generate a second optical modulation signal;
a first optical semiconductor device that is the optical semiconductor device according to claim 1, and to which the first optical modulation signal is to be input;

a second optical semiconductor device that is the optical semiconductor device according to claim 1, and to which the second optical modulation signal is to be input; and a multiplexer that multiplexes an output signal of the first optical semiconductor device and an output signal of the second optical semiconductor device.

5. The optical modulator according to claim 4, comprising:

an optical output monitor configured to monitor an output signal of the multiplexer, wherein in the first optical semiconductor device and the second optical semiconductor device, the bias of the bias control circuitry and the reverse bias of the reverse bias control circuitry are adjusted in accordance with a detection signal of the optical output monitor.

6. The optical modulator according to claim 4, wherein the first optical modulation circuitry is a Mach-Zehnder type interferometer.

7. An optical transmission device comprising:

the optical modulator according to claim 4.

8. An optical modulator comprising:

a first optical modulation circuitry configured to generate a first optical modulation signal;

a second optical modulation circuitry configured to generate a second optical modulation signal;

a third optical modulation circuitry configured to generate a third optical modulation signal;

a fourth optical modulation circuitry configured to generate a fourth optical modulation signal;

a first optical semiconductor device that is the optical semiconductor device according to claim 1, and to which the first optical modulation signal is to be input;

a second optical semiconductor device that is the optical semiconductor device according to claim 1, and to which the second optical modulation signal is to be input;

a third optical semiconductor device that is the optical semiconductor device according to claim 1, and to which the third optical modulation signal is to be input;

a fourth optical semiconductor device that is the optical semiconductor device according to claim 1, and to which the fourth optical modulation signal is to be input;

a first multiplexer that multiplexes an output signal of the first optical semiconductor device and an output signal of the second optical semiconductor device;

a second multiplexer that multiplexes an output signal of the third optical semiconductor device and an output signal of the fourth optical semiconductor device;

a fifth optical semiconductor device that is the optical semiconductor device according to claim 1, and to which an output signal of the first multiplexer is to be input;

a sixth optical semiconductor device that is the optical semiconductor device according to claim 1, and to which an output signal of the second multiplexer is to be input; and a third multiplexer that multiplexes an output signal of the fifth optical semiconductor device and an output signal of the sixth optical semiconductor device.

9. The optical modulator according to claim 8, comprising:

an optical output monitor that monitors output signals of the first multiplexer, the second multiplexer, and the third multiplexer, wherein in the first optical semiconductor device, the second optical semiconductor device, the third optical semiconductor device, the fourth optical semiconductor device, the fifth optical semiconductor device, and the sixth optical semiconductor device, the bias of the bias control circuitry and the reverse bias of the reverse bias control circuitry are adjusted in accordance with a detection signal of the optical output monitor.

10. The optical modulator according to claim 8, wherein the first optical modulation circuitry is a Mach-Zehnder type interferometer.

11. An optical transmission device comprising the optical modulator according to claim 8.

12. An optical modulator comprising:

a first optical modulation circuitry configured to generate a first optical modulation signal;

a second optical modulation circuitry configured to generate a second optical modulation signal;

a first optical semiconductor device that is the optical semiconductor device according to claim 2, and to which the first optical modulation signal is to be input;

a second optical semiconductor device that is the optical semiconductor device according to claim 2, and to which the second optical modulation signal is to be input; and a multiplexer that multiplexes an output signal of the first optical semiconductor device and an output signal of the second optical semiconductor device.

13. The optical modulator according to claim 12, comprising:

an optical output monitor configured to monitor an output signal of the multiplexer, wherein in the first optical semiconductor device and the second optical semiconductor device, the bias of the bias control circuitry and the reverse bias of the reverse bias control circuitry are adjusted in accordance with a detection signal of the optical output monitor.

14. The optical modulator according to claim 12, wherein the first optical modulation circuitry is a Mach-Zehnder type interferometer.

15. An optical transmission device comprising:

the optical modulator according to claim 12.

16. An optical modulator comprising:

a first optical modulation circuitry configured to generate a first optical modulation signal;

a second optical modulation circuitry configured to generate a second optical modulation signal;

a third optical modulation circuitry configured to generate a third optical modulation signal;

a fourth optical modulation circuitry configured to generate a fourth optical modulation signal;

a first optical semiconductor device that is the optical semiconductor device according to claim 2, and to which the first optical modulation signal is to be input;

a second optical semiconductor device that is the optical semiconductor device according to claim 2, and to which the second optical modulation signal is to be input;

a third optical semiconductor device that is the optical semiconductor device according to claim 2, and to which the third optical modulation signal is to be input;

a fourth optical semiconductor device that is the optical semiconductor device according to claim 2, and to which the fourth optical modulation signal is to be input;

a first multiplexer that multiplexes an output signal of the first optical semiconductor device and an output signal of the second optical semiconductor device;

a second multiplexer that multiplexes an output signal of the third optical semiconductor device and an output signal of the fourth optical semiconductor device;

a fifth optical semiconductor device that is the optical semiconductor device according to claim 2, and to which an output signal of the first multiplexer is to be input;

a sixth optical semiconductor device that is the optical semiconductor device according to claim 2, and to which an output signal of the second multiplexer is to be input; and a third multiplexer that multiplexes an output signal of the fifth optical semiconductor device and an output signal of the sixth optical semiconductor device.

17. The optical modulator according to claim 16, comprising:

an optical output monitor that monitors output signals of the first multiplexer, the second multiplexer, and the third multiplexer, wherein in the first optical semiconductor device, the second optical semiconductor device, the third optical semiconductor device, the fourth optical semiconductor device, the fifth optical semiconductor device, and the sixth optical semiconductor device, the bias of the bias control circuitry and the reverse bias of the reverse bias control circuitry are adjusted in accordance with a detection signal of the optical output monitor.

18. The optical modulator according to claim 16, wherein the first optical modulation circuitry is a Mach-Zehnder type interferometer.

19. An optical transmission device comprising the optical modulator according to claim 16.

* * * * *